US012418116B2

(12) United States Patent
Jian et al.

(10) Patent No.: US 12,418,116 B2
(45) Date of Patent: Sep. 16, 2025

(54) MMWAVE ANTENNA-FILTER MODULE

(71) Applicant: Telefonaktiebolaget LM Ericsson (publ), Stockholm (SE)

(72) Inventors: Chunyun Jian, Ottawa (CA); Martin Da Silveira, Ottawa (CA); Neil McGowan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/536,773

(22) Filed: Dec. 12, 2023

(65) Prior Publication Data

US 2024/0113444 A1 Apr. 4, 2024

Related U.S. Application Data

(62) Division of application No. 17/608,540, filed as application No. PCT/IB2019/056031 on Jul. 15, 2019, now Pat. No. 11,862,856.

(51) Int. Cl.
*H01Q 21/00* (2006.01)
*H01Q 21/06* (2006.01)

(52) U.S. Cl.
CPC ..... *H01Q 21/0087* (2013.01); *H01Q 21/0025* (2013.01); *H01Q 21/061* (2013.01)

(58) Field of Classification Search
None
See application file for complete search history.

(56) References Cited

U.S. PATENT DOCUMENTS

| | | | | |
|---|---|---|---|---|
| 6,770,159 | B1 | 8/2004 | Tebbe et al. | |
| 10,714,838 | B2 * | 7/2020 | Kitamura | H01Q 23/00 |
| 2004/0262645 | A1 | 12/2004 | Huff et al. | |
| 2010/0053026 | A1 | 3/2010 | Van Der Poel | |
| 2010/0245179 | A1 | 9/2010 | Puzella et al. | |
| 2012/0235881 | A1 | 9/2012 | Pan et al. | |
| 2015/0325925 | A1 | 11/2015 | Kamgaing et al. | |

(Continued)

FOREIGN PATENT DOCUMENTS

| | | | |
|---|---|---|---|
| CN | 101390253 | A | 3/2009 |
| CN | 107548232 | A | 1/2018 |
| WO | 2018/128606 | A1 | 7/2018 |

OTHER PUBLICATIONS

International Search Report and Written Opinion dated Mar. 19, 2020 issued in PCT Application No. PCT/IB2019/056031, filed Jul. 15, 2019, consisting of 14 pages.

(Continued)

*Primary Examiner* — Long Pham
(74) *Attorney, Agent, or Firm* — Weisberg I.P. Law, P.A.

(57) ABSTRACT

An antenna-filter array module and method of manufacturing an antenna-filter array module are provided. One method of manufacturing includes bonding a low temperature co-fired ceramic, LTCC, tile having a plurality of antennas and corresponding filters to a first side of the module PCB via a first set of solder balls, a coefficient of thermal expansion, CTE, of the module PCB being within a predetermined amount of a CTE of the radio PCB. The method further includes cutting the LTCC tile into a plurality of reliability units after the bonding, each reliability unit having a size that is less than a predetermined largest reliable size.

8 Claims, 11 Drawing Sheets

(56) References Cited

U.S. PATENT DOCUMENTS

| | | | | |
|---|---|---|---|---|
| 2017/0229784 | A1 | 8/2017 | Kitamura et al. | |
| 2018/0351262 | A1 * | 12/2018 | Yoon ...................... | H01Q 9/045 |

OTHER PUBLICATIONS

Chinese Office Action dated Oct. 31, 2024 and summary English translation of the Chinese Office Action issued in corresponding Chinese Application No. 201980098464.1, consisting of 14 pages.

Wei Jinghui et al., Design of MEMS Dual-Band Microstrip Antenna Array Based on High Resistivity Silicon Substrate; University of Electronic Science and Technology of China; Master Dissertation; 4th Asia International Symposium on Mechatronics, Singapore, Dec. 15-18, 2010, consisting of 77 pages.

Chinese Notice of Allowance and English translation of the Chinese Notice of Allowance dated Jun. 25, 2025 issued in corresponding Chinese Application No. 201980098464.1, consisting of 9 pages.

* cited by examiner

STEP 3

MMWAVE ANTENNA-FILTER MODULE

CROSS REFERENCE TO RELATED APPLICATIONS

This application is a Divisional of application Ser. No. 17/608,540 filed Nov. 3, 2021 entitled "mmWAVE ANTENNA-FILTER MODULE" which was a Submission Under 35 U.S.C. § 371 for U.S. National Stage Patent Application of International Application Number: PCT/IB2019/056031, filed Jul. 15, 2019 entitled "mmWAVE ANTENNA-FILTER MODULE," the entireties of both of which are incorporated herein by reference.

TECHNICAL FIELD

This disclosure relates to wireless communications, and in particular to an antenna-filter array module and a method of its manufacture.

BACKGROUND

The use of integrated low temperature co-fired (LTCC) antenna-filter array modules for millimeter wave (mmWave) Fifth Generation (5G) advanced antenna systems (AAS) has been suggested. Routing circuits for the antenna-filter array can also be integrated together with the antenna-filter array, as shown in FIG. 1. FIG. 1 shows a top view and a sectional side view of an antenna-filter array module 10. The antenna-filter array module 10 has an antenna-filter array 12 that includes an antenna layer 12*a* and a filter layer 12*b* above a routing layer 12*c*. The antenna layer has a plurality of antenna elements in an array of N rows of M elements in each row, where N and M are integers and may be equal.

In the example of FIG. 1, there are four rows (N=M=4) of cross-polarized antenna elements 14 mounted above a radio printed circuit board (PCB) 16 via solder balls 18.

Although the integrated LTCC antenna-filter array module has advantages in comparison to other antenna-filter integration solutions, such as higher radio frequency (RF) performance, smaller size and lower cost, etc., such design has proven to be unreliable for mmWave 5G AAS.

In a study to evaluate the reliability of the LTCC antenna-filter array module mounted on a standard type radio PCB Megatron-6, three sets of dimensions (25×25 mm, 12×12 mm and 6×6 mm) of the LTCC antenna-filter module were tested. Only the smallest dimension 6×6 (mm) module sample corresponding to a 1×1 (i.e., single element) 28 GHz antenna-filter unit dimension showed a reliability result close to the radio requirement. The larger two module samples failed during the test.

Technically, module reliability is determined by two main factors: one is the difference of mismatched Coefficients of Thermal Expansion (CTE) between the antenna-filter array 12 and its mounting radio PCB 16; another is the dimension of the antenna-filter array 12 that determines a span of solder balls 18 over the radio PCB 16.

Tests show that failure may be due to solder balls cracking. This cracking is directly caused by an alternately changing thermal stress imposed on the solder balls due to the mismatched CTE. The larger the difference between the two CTEs, the stronger the thermal stress on the solder balls. In addition, the larger the span between the solder balls, the stronger the thermal stress imposed on the solder balls. In general, a larger dimension of the module requires a larger span between solder balls. Therefore, to enhance module reliability, the difference of the CTEs should be reduced or the dimension of the LTCC antenna-filter array should theoretically be reduced.

However, since the antenna-filter array dimension (also referred to as size herein) is dictated by other engineering concerns, such as avoiding grating lobes and reduction of mutual coupling between antenna elements, reduction of the antenna-filter array dimension is not a desirable option. Altering the difference between CTEs is impracticable, also. Types of standard printed circuit board materials, such as Megatron-6 and FR4 have a similar CTE ~15 ppm/C. In contrast, the LTCC antenna-filter array usually has a CTE ~7 ppm/C, which is just a half of the CTE of Megatron-6 or FR4 PCB. Since the Megatron-6 and FR4 are widely used in the radio manufacture industry, it is infeasible to use other materials for the radio PCB that might more closely match the CTE of the LTCC antenna-filter array.

FIGS. 2-5 show existing proposals that have attempted to solve these reliability problems. For example, FIG. 2 shows a proposal that uses the well-known underfill technique, where underfill material 20 lies between the antenna-filter array 12 and the radio PCB 16. This technique was widely used in the industry for mounting a chip of large dimension on a PCB. This method is not preferred by engineers because it is dirty and, once the chip is mounted, the underfill material 20 cannot easily be removed from the radio PCB 16.

FIG. 3 shows a second proposal that uses solder-coated polymer balls 22. This type of connecting ball is much softer than a conventional solder ball because the solder-coated polymer ball has a polymer core inside. A drawback of this solution is its very high cost.

FIG. 4 shows a third proposal that uses an interposer board 24 inserted between the LTCC antenna-filter array and the radio PCB. As the interposer board 24 has a CTE that lies between the CTE of the LTCC antenna-filter array 12 and the CTE of the radio PCB 16, the imposer board 24 can reduce the thermal stress imposed on the solder balls 18 that are placed between the antenna-filter array 12 and the interposer board 24. However, there still is a CTE mismatch between the antenna-filter array 12 and the interposer board 24, and therefore it cannot completely solve the reliability issue of the LTCC antenna-filter array module 10.

FIG. 5 shows a fourth existing proposal, where the LTCC antenna-filter array 12 of FIG. 1, is modified by cutting the antenna-filter array 12 in to a plurality of single polarized antenna-filter elements 26 that are then individually mounted on the radio PCB 16 through a standard reflow soldering process. However, during the reflow soldering process, these individual LTCC antenna-filter elements could lose their alignment due to solder melting, as shown in FIG. 5. As a result, the entire antenna array could have very bad element alignments that would cause a very poor beamforming performance.

SUMMARY

Some embodiments advantageously provide an antenna-filter array module and a method of its manufacture. According to one aspect, a method includes identifying a maximum size of an LTCC antenna-filter unit mounted on a radio PCB that does not have a reliability issue. This may be done by experimentation. The method includes soldering a LTCC tile (which may typically be larger than the identified maximum size and has at least two antenna elements) on a selected module PCB that has a CTE that is close to or equal to the CTE of the radio PCB, the closer the two CTEs, the greater the reliability of the antenna-filter array module, in at least some embodiments. When the antenna-filter array module is assembled, the selected module PCB lies between the LTCC tile and the radio PCB. After the LTCC tile is soldered to the module PCB, the tile is diced into antenna-filter units having a dimension that is not greater than the identified maximum size. An antenna-filter unit having a size that is not greater than the identified maximum size is referred to herein as a reliability issue free unit or more simply, a reliability unit.

According to one aspect, a method of manufacturing an antenna-filter array module that includes at least two antenna elements on a low temperature co-fired ceramic, LTCC, tile couplable to a radio printed circuit board, PCB, in an antenna array, includes soldering an LTCC tile having the at least two antenna elements to a first side of a module PCB, the soldering including soldering at first soldering sites lying between the LTCC tile and the module PCB, the module PCB having a size at least as great as a size of the LTCC tile. Following the soldering, the method includes cutting the LTCC tile into reliability issue free, RIF, units, each RIF unit having a size not greater than a predetermined largest reliable size. The method further includes forming a plurality of second soldering sites configured to couple with the radio PCB on a second side of the module PCB opposite the first side of the module PCB.

According to this aspect, in some embodiments, the method further includes coupling the module PCB to the radio PCB, the coupling including soldering at the plurality of second soldering sites. In some embodiments, a difference between a coefficient of thermal expansion, CTE, of the module PCB and a CTE of the radio PCB is less than a predetermined amount. In some embodiments, the module PCB and the radio PCB are of the same material and have the same CTE. In some embodiments, a size of the module PCB is greater than an area of the LTCC tile. In some embodiments, the size of an RIF unit is a size of one antenna element. In some embodiments, the size of an RIF unit is a size of two rows of two antenna elements per row. In some embodiments, the size of an LTCC tile is N rows of M antenna elements per row, where N and M are integers. In some embodiments, the size of an RIF unit is a size of an antenna element of the at least two antenna elements. In some embodiments, a module PCB has a size of at least two RIF units. In some embodiments, the solder structures are solder balls or bumps.

According to another aspect, an antenna-filter array module is provided. The antenna-filter array module includes a module printed circuit board, PCB, having a first side and a second side, the first side having first soldering structures and configured to be soldered to a low-temperature co-fired ceramic, LTCC, tile the second side having second soldering structures, the second side configured to be coupled to a radio PCB. The antenna-filter array module further includes an LTCC tile having at least two antenna elements and corresponding filters, the LTCC tile being soldered to the first side of the module PCB at the first soldering structures and cuttable into reliability issue free, RIF, units, each RIF unit being of a size not greater than a predetermined largest reliable size.

According to this aspect, in some embodiments, a difference between a coefficient of thermal expansion, CTE, of the module PCB and a CTE of the radio PCB is chosen to be less than a predetermined amount. In some embodiments, the module PCB and the radio PCB are of the same material and have the same CTE. In some embodiments, a size of the module PCB is greater than an area of an LTCC tile. In some embodiments, the size of an RIF unit is a size of one antenna element. In some embodiments, the size of an RIF unit is a size of two rows of two antenna elements per row. In some embodiments, the size of an LTCC tile is a size of N rows of M antenna elements per row. In some embodiments, the size of an RIF unit is a size of an antenna element of the at least two antenna elements. In some embodiments, a module PCB has a size equal to the LTCC tile before cutting.

According to yet another aspect, a method of manufacturing an antenna-filter array module configured to be coupled to a radio printed circuit board, PCB, the antenna-filter array module having a module PCB having a first side on which a first set of solder balls are positioned and having a second side on which a second set of solder balls are positioned, is provided. The method includes bonding a low temperature co-fired ceramic, LTCC, tile having a plurality of antennas and corresponding filters to a first side of the module PCB via a first set of solder balls, a coefficient of thermal expansion, CTE, of the module PCB being within a predetermined amount of a CTE of the radio PCB. The method further includes cutting the LTCC tile into a plurality of reliability units after the bonding, each reliability unit having a size that is less than a predetermined largest reliable size.

According to this aspect, in some embodiments, a size of the module PCB is a size of an LTCC tile. In some embodiments, the module PCB and the radio PCB are of the same material and have the same CTE.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
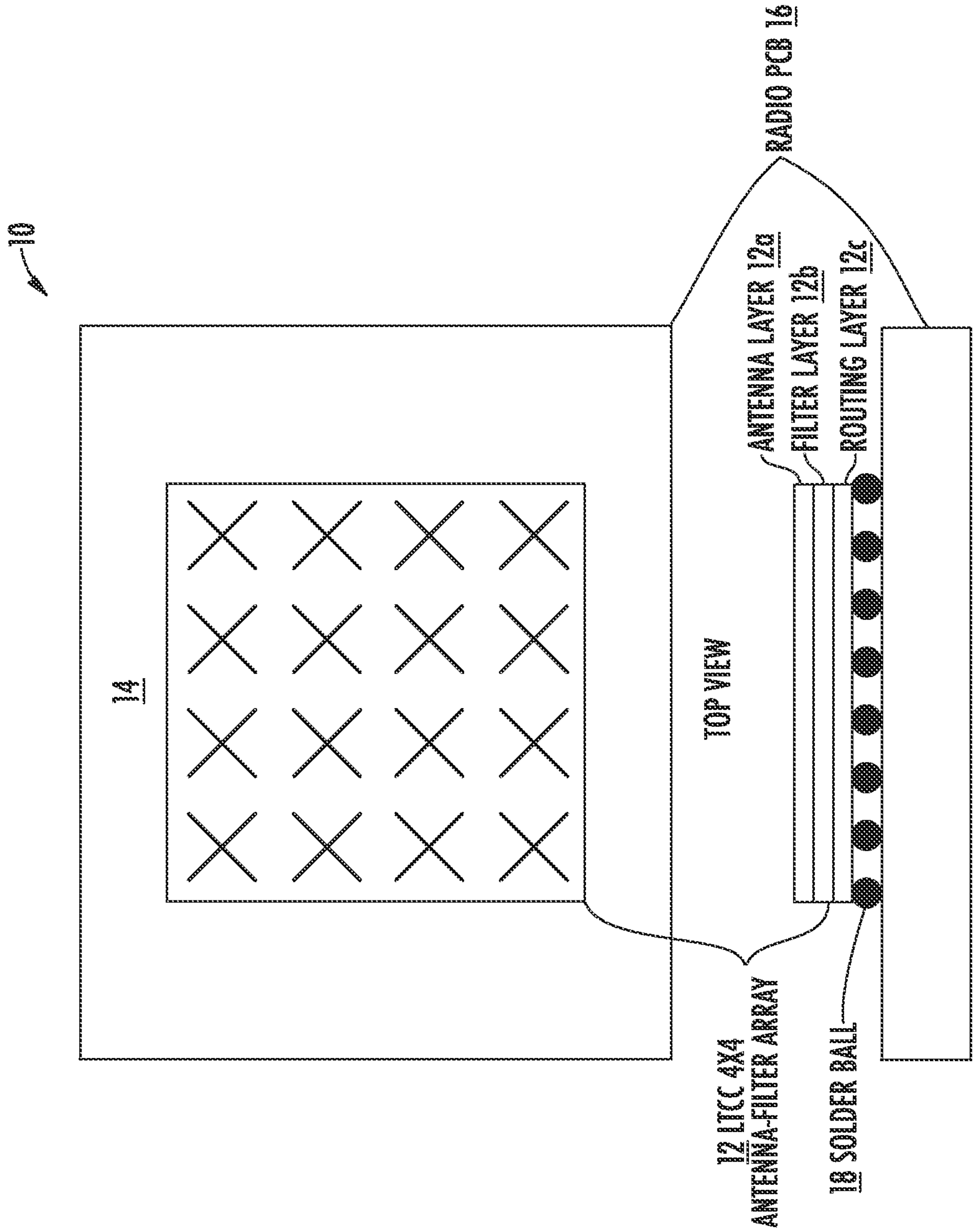
FIG. 1 shows a top view and a sectional side view of an antenna-filter array module.
Figure 2:
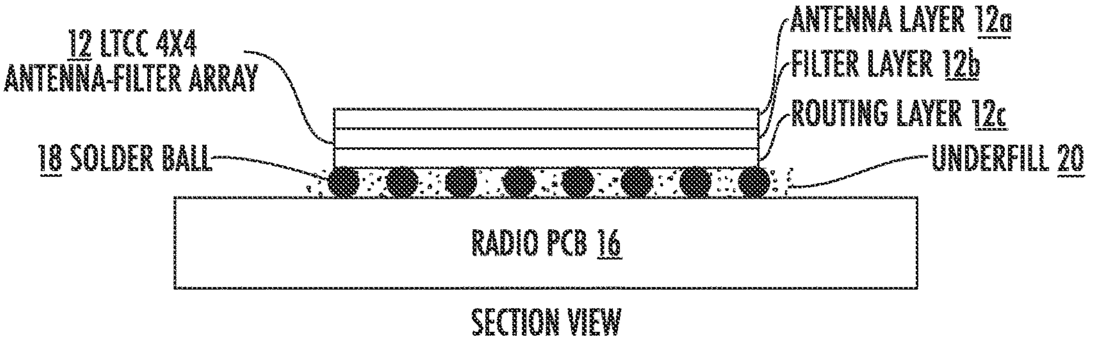
FIG. 2 shows an application of an underfill technique.
Figure 3:
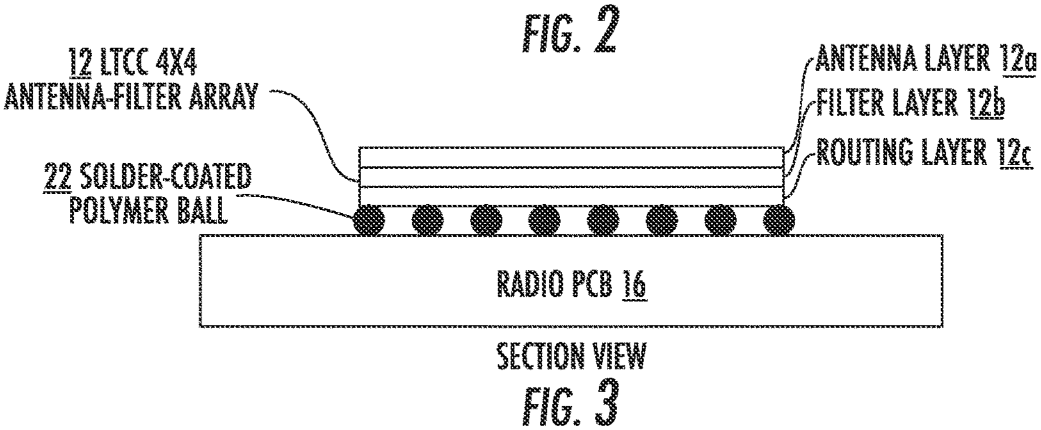
FIG. 3 shows an application using solder-coated polymer balls.
Figure 4:
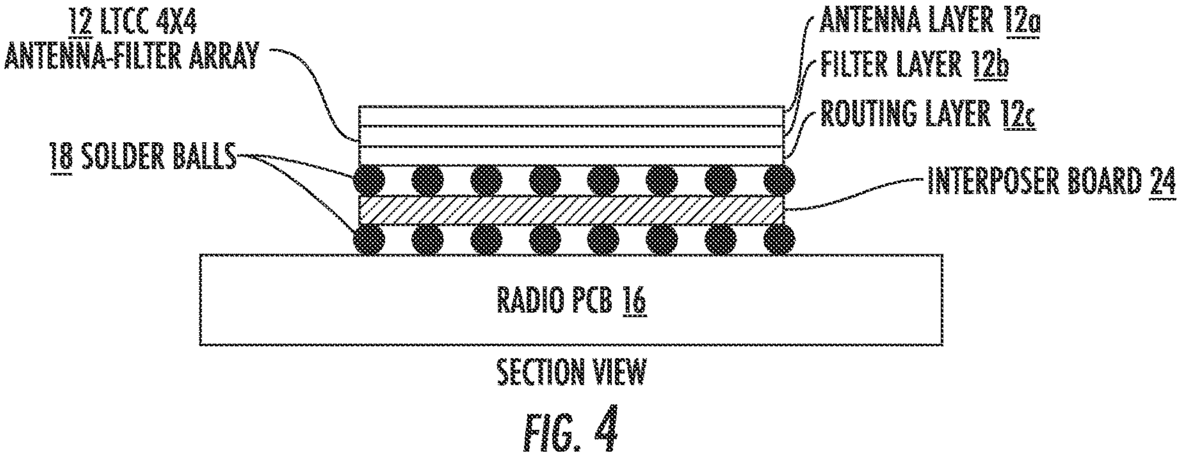
FIG. 4 shows an interposer board inserted between the LTCC antenna-filter array and the radio PCB.

Before describing in detail exemplary embodiments, it is noted that the embodiments reside primarily in combinations of apparatus components and processing steps related to an antenna-filter array module and a method of its manufacture. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 6:
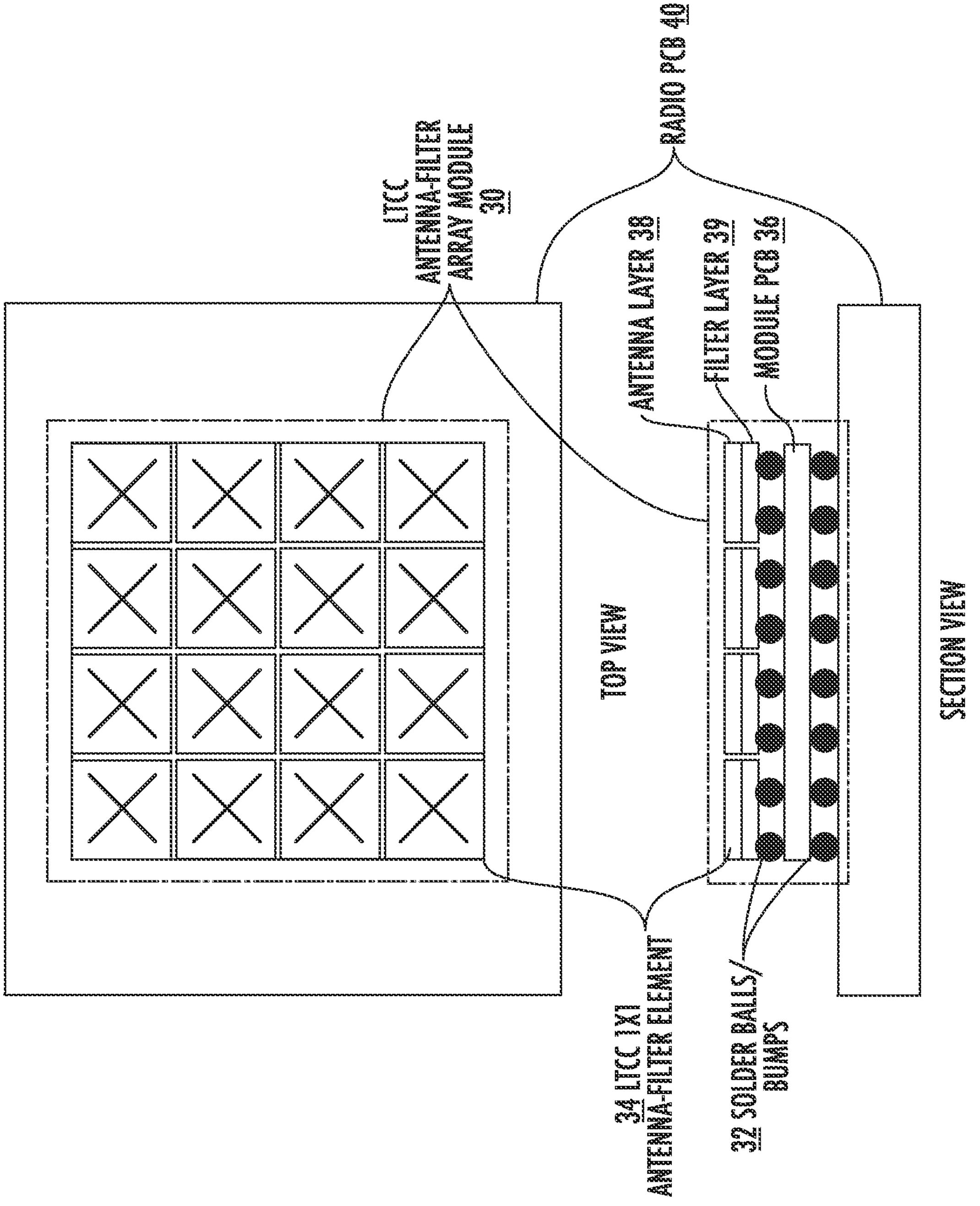
FIG. 6 shows one embodiment of an LTCC antenna-filter made according to principles set forth herein.

Referring again to the drawing figures, where like reference numerals denote like elements, FIG. 6 shows one embodiment of an antenna-filter array module 30 that solves the above-mentioned problems of CTE mismatch and large span between solder balls 32 both causing unreliability, without introducing problems such as dirty underfill, expensive solder-coated polymer balls, and antenna element misalignment. Components of the antenna-filter array module 30 include LTCC antenna-filter elements 34, one module PCB 36 and two layers of solder balls/bumps 32 or other solder structure at suitable soldering sites. As shown in FIG. 6, the antenna-filter array module 30 has antenna-filter units (elements) 34, each antenna-filter unit (element) 34 having an antenna design on a top layer 38 and a filter design on the lower layer 39 of the antenna-filter unit 34. In some embodiments, routing circuits for the antenna 38 and filter 39 array, such as transmission lines and splitters/combiners, etc., can be designed within the module PCB 36 if preferred. Also, the two layers of solder balls/bumps 32 can have different melting temperatures depending on the radio PCB 40 assembly process. Note that although FIG. 6 discloses only one antenna element per antenna-filter unit 34, it is noted that there can be more than one antenna element per antenna-filter unit. Different arrays of antenna elements may make up an antenna-filter unit. For example, see the 2×2 antenna-filter unit of FIG. 8, discussed below in detail. Note also that radio PCB 40 can be a known/existing radio PCB such as radio PCB 16. In other words, the LTCC antenna-filter module disclosed herein is backward compatible, being able to couple to existing radio PCBs, and forward compatible, being able to couple to radio PCBs yet to be developed.

Figure 7A:
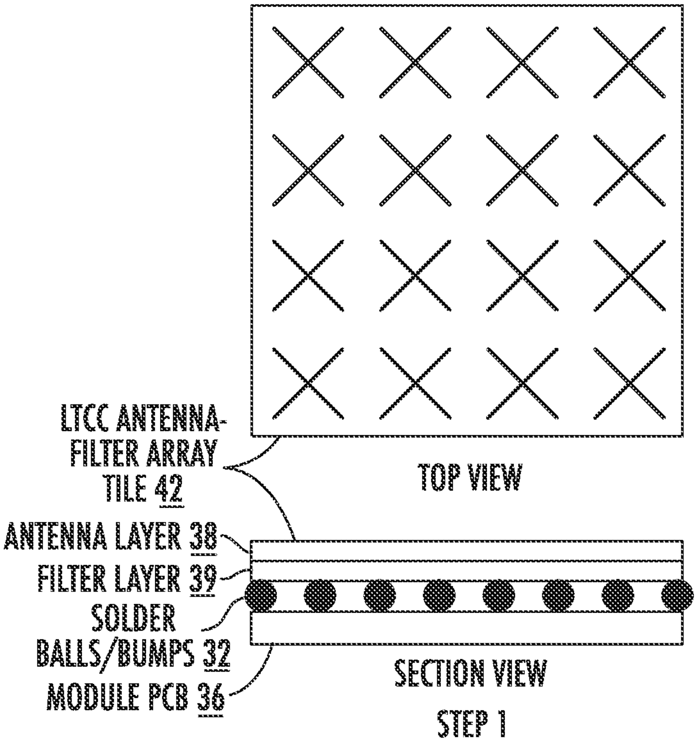
FIGS. 7A, 7B and 7C show three steps for forming an antenna-filter array module according to principles set forth herein.
Figure 7B:
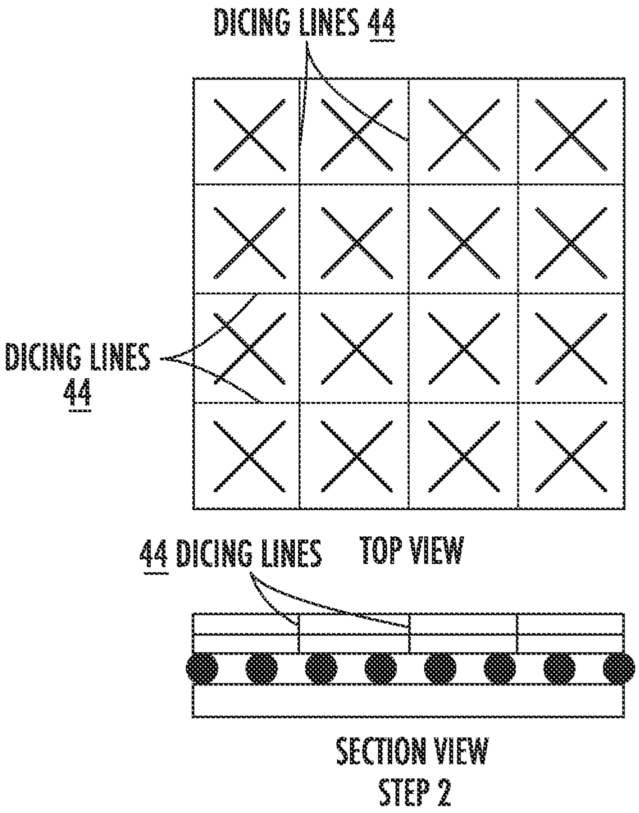
Figure 7C:
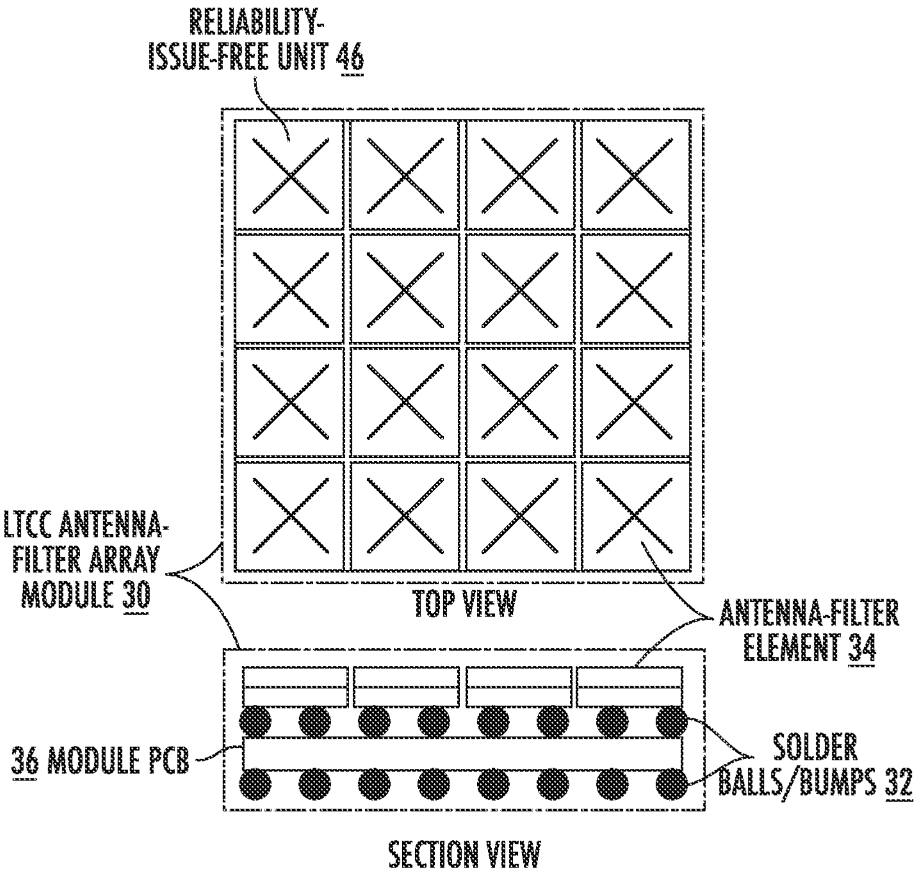

FIGS. 7A-7C show steps of one embodiment of a method for manufacturing the LTCC antenna-filter array module 30 disclosed herein. The method starts with an LTCC tile 42 having an array of at least two antenna elements with their underlying filters (antenna-filter element 34, for example).

Figure 5:
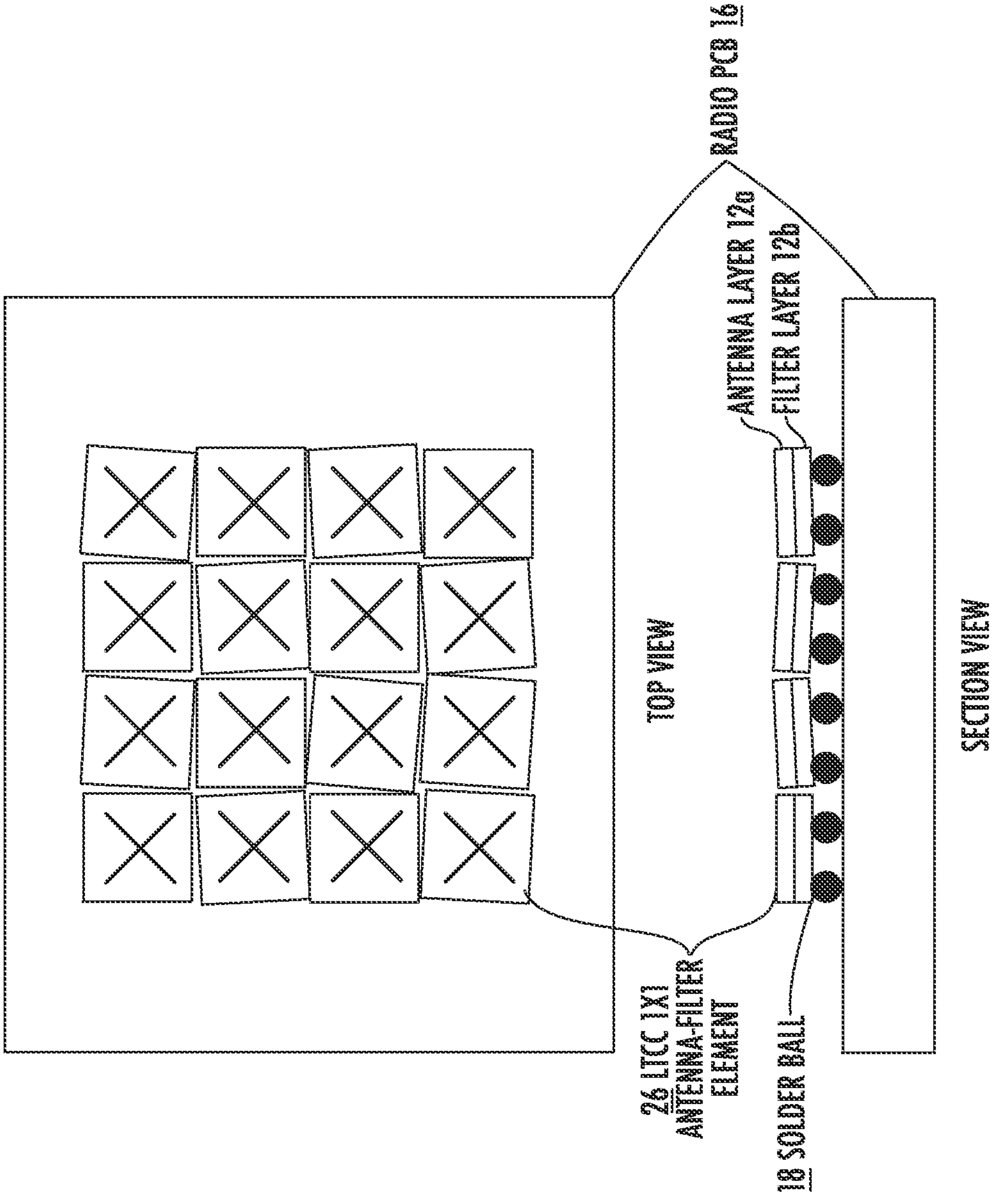
FIG. 5 shows an array of misaligned LTCC antenna-filter elements where the elements are cut first and then bonded to a radio PCB via a set of solder balls.

- Step 1 (FIG. 7A): Mount the LTCC tile 42 to a first side of a module PCB 36 via soldering structures at soldering sites, where the module PCB 36 is chosen to have a CTE that is the same as or close to the CTE of an expected radio PCB.
- Step 2 (FIG. 7B): Dice (cut) the LTCC tile 42 into antenna-filter units 34 that have the same dimension as the identified maximum LTCC antenna-filter array size that does not have reliability issues. Such an antenna-filter unit is called a reliability-issue-free (RIF) unit 46. Note that this step may be performed after Step 1, to avoid the situation of FIG. 5, where the mounting occurs after the cutting. Thus, the dicing lines 44 denote boundaries of RIF units 46.
- Step 3 (FIG. 7C): Clean up all dicing debris and create soldering sites on a second side of the module PCB 36 opposite the first side of the module PCB 36.

It is noted that Step 2 and Step 3 in FIGS. 7B and 7C depict only one embodiment, where the reliability-issue-free unit is a single antenna element (a 1×1 array), the smallest array size. In general, the reliability-issue-free unit can be an N×M array, where N and M are integers that may be equal. The size of the RIF unit may depend on what LTCC material and what PCB material are used.

Figure 8:
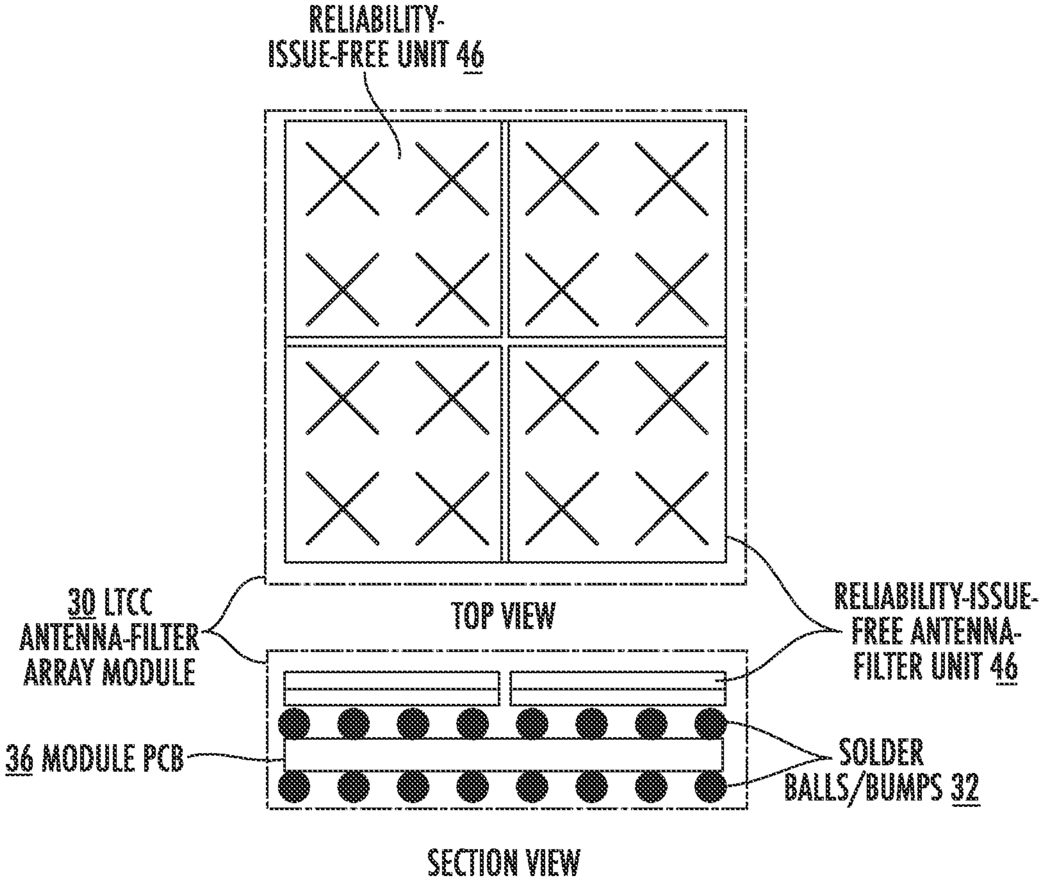
FIG. 8 shows an embodiment of an antenna-filter array module where an RIF is a 2×2 array of antenna elements.

FIG. 8 illustrates a top view and sectional side view of an LTCC antenna-filter array module 30, where the RIF unit 46 is a 2×2 array. Thus, in the example of FIG. 8, the LTCC tile that has 16 dual-polarized antenna elements, and which is cut into four quadrants each quadrant occupied by a different RIF unit 46. Note that in some embodiments, the 16 dual-polarized antenna elements may each consist of two perpendicular antennas. Other differently polarized antenna elements may be employed.

Thus, once bound to the module PCB 36, the LTCC tile 42 is diced to create small mechanically independent units, defined in FIG. 7 by dicing lines 44, where each such unit is reliability-issue-free (RIF). For these units, there will be no reliability issue due to thermal expansion mismatch or too large of a span between edge soldering sites (such as soldering balls or bumps) on the first side of the module PCB 36, since no unit is greater than the identified maximum LTCC antenna-filter array size that does not have reliability issues.

Figure 9:
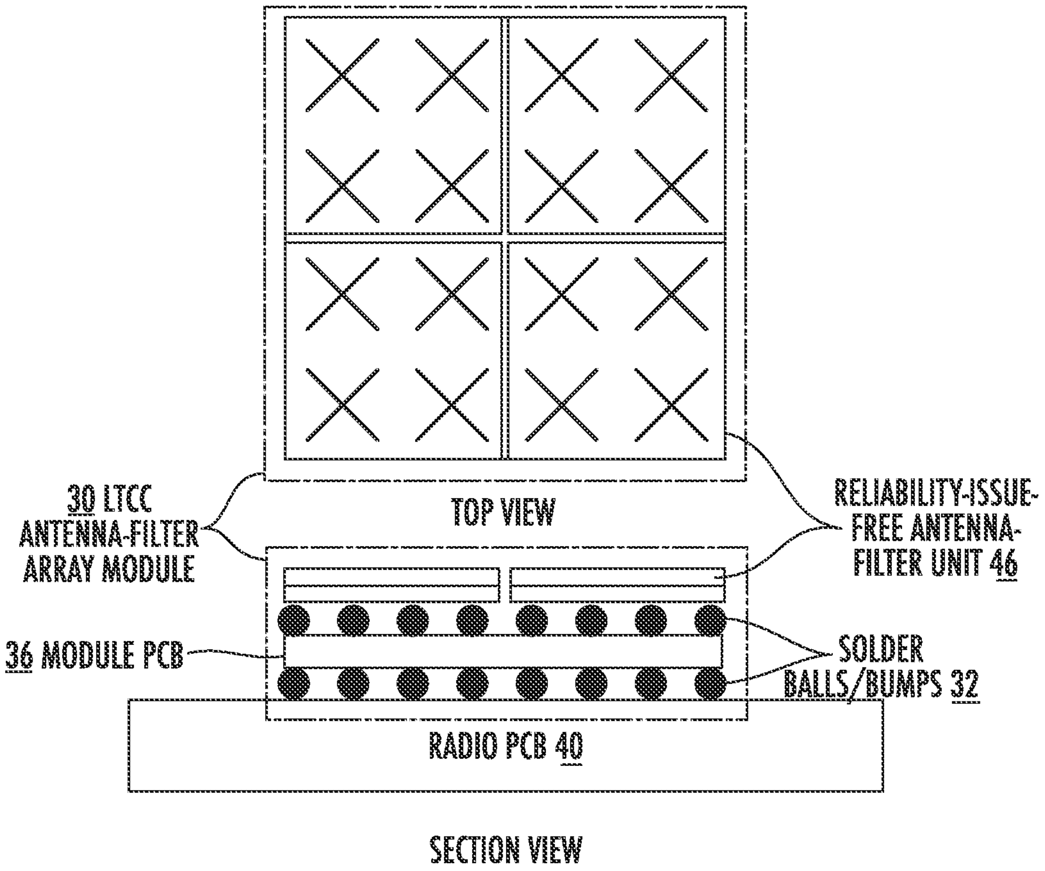
FIG. 9 shows the embodiment of FIG. 8 mounted to the radio PCB.

When the LTCC antenna-filter module is mounted on the radio PCB through the second side solder sites as shown in FIG. 6 and FIG. 9, for example, and when the module PCB 36 has a CTE that is equal to or close to the CTE of the radio PCB 40, there is no thermal mismatch or small thermal mismatch between the module PCB 36 and the radio PCB 40. Thus, the second set of solder structures on the second side of the module PCB 36 should not have a reliability issue.

As result of the above, the entire LTCC antenna-filter array module 30 as manufactured according to the above recited steps should not have reliability issues when mounted on the radio PCB 40. Thus, some embodiments provide a comprehensive approach to solving the reliability issues of the LTCC antenna-filter array module 30 mounted on a radio PCB 40. The LTCC antenna-filter array module 30 described herein may be mounted simply on the radio PCB 40 at low cost. Also, in at least some embodiments, the LTCC antenna-filter array module 30 has higher beamforming performance than the existing solution proposals described above, because all antenna-filter units are aligned and because the gaps between adjacent antenna-filter units impede surface-traveling electromagnetic waves that degrade beamforming performance. Further, because the LTCC antenna-filter array module is a physical module, the assembly yield of the radio manufacture will not be affected by the presence of the module.

Figure 10:
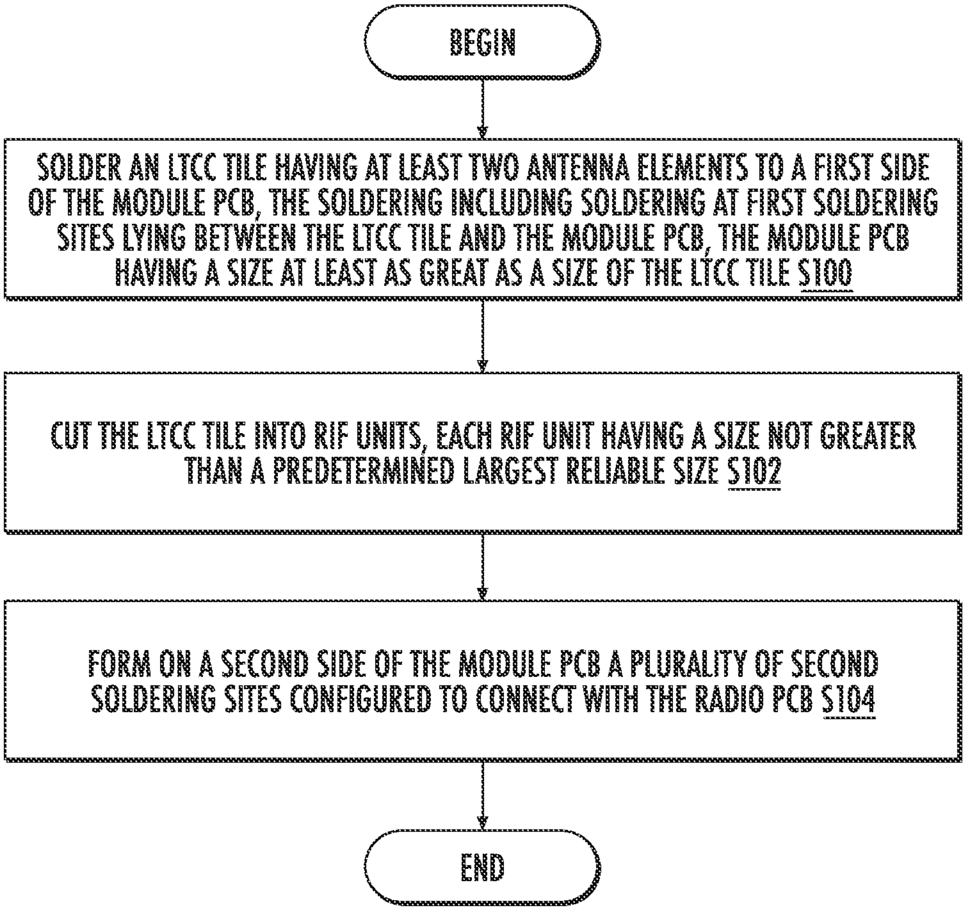
FIG. 10 is a flowchart of an exemplary process for manufacturing an antenna-filter array module.

FIG. 10 is a flowchart of an exemplary process for manufacturing an antenna-filter array module. The process includes soldering an LTCC tile 42 having the at least two antenna elements 34 to a first side of a module PCB, the soldering including soldering at first soldering sites lying between the LTCC tile 42 and the module PCB 36, the module PCB 36 having a size at least as great as a size of the LTCC tile 42 (Block S100). The process also includes cutting the LTCC tile 42 into reliability issue free, RIF, units 46, each RIF unit 46 having a size not greater than a predetermined largest reliable size (Block S102). The process further includes forming a plurality of second soldering sites (e.g., solder balls/bumps 32) configured to couple with the radio PCB 40 on a second side of the module PCB 36 opposite the first side of the module PCB (Block S104).

Figure 11:
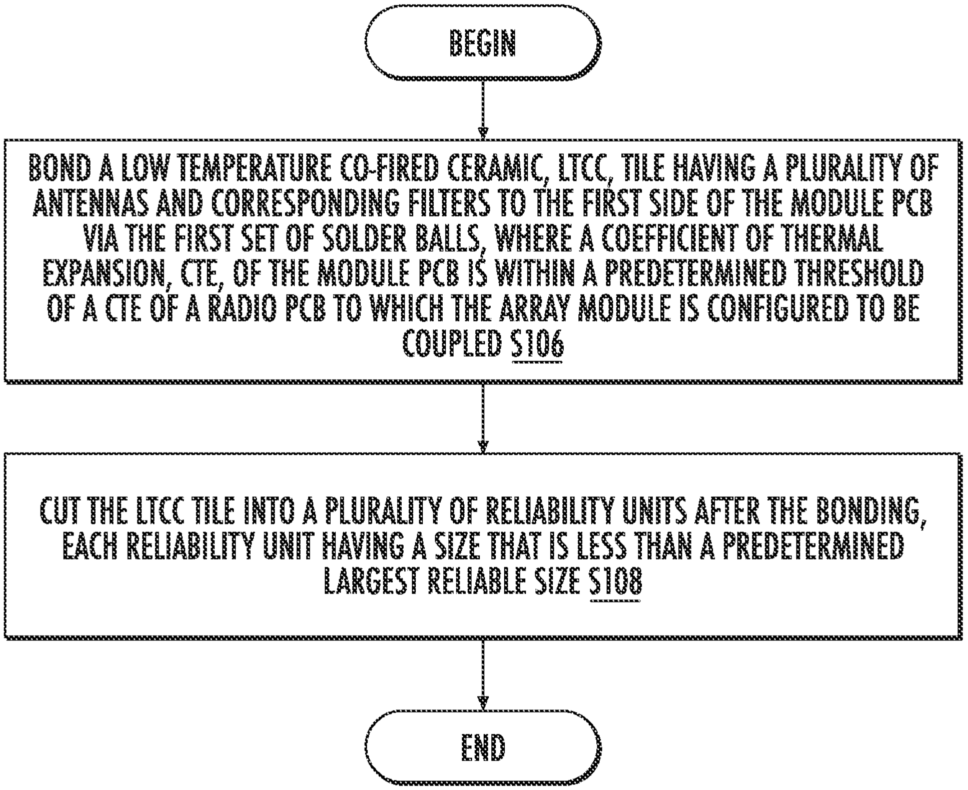
FIG. 11 is a flowchart of an alternative exemplary process for manufacturing an antenna-filter array module.

FIG. 11 is a flowchart of an alternative exemplary process for manufacturing an antenna-filter array module 30. The process (Block S106) includes bonding a low temperature co-fired ceramic, LTCC, tile 42 having a plurality of antennas and corresponding filters (to form an antenna-filter element 34) to a first side of the module PCB 36 via a first set of solder balls 32, a coefficient of thermal expansion, CTE, of the module PCB 36 being within a predetermined amount of a CTE of the radio PCB 40. The process further includes cutting the LTCC tile 42 into a plurality of reliability units 46 after the bonding, each reliability unit 46 having a size that is less than a predetermined largest reliable size.

Therefore, some embodiments described herein include LTCC antenna-filter modules designed at low cost, small size and with high-performance in the mmWave 5G spectrum with NR AAS, thereby removing a last reliability problem of the LTCC module over the radio PCB.

According to one aspect, a method of manufacturing an antenna-filter array module 30 that includes at least two antenna elements on a low temperature co-fired ceramic, LTCC, tile 42 couplable to a radio printed circuit board, PCB 40, in an antenna array, includes soldering an LTCC tile 42 having the at least two antenna elements to a first side of a module PCB 36, the soldering including soldering at first soldering sites lying between the LTCC tile 42 and the module PCB 36, the module PCB 36 having a size at least as great as a size of the LTCC tile 42. Following the soldering, the method includes cutting the LTCC tile 42 into reliability issue free, RIF, units 46, each RIF unit 46 having a size not greater than a predetermined largest reliable size. The method further includes forming a plurality of second soldering sites configured to couple with the radio PCB 40 on a second side of the module PCB 36 opposite the first side of the module PCB 36.

According to this aspect, in some embodiments, the method further includes coupling the module PCB 36 to the radio PCB, the coupling including soldering at the plurality of second soldering sites. In some embodiments, a difference between a coefficient of thermal expansion, CTE, of the module PCB 36 and a CTE of the radio PCB is less than a predetermined amount. In some embodiments, the module PCB 36 and the radio PCB 40 are of the same material and have the same CTE. In some embodiments, a size of the module PCB 36 is greater than an area of the LTCC tile 42. In some embodiments, the size of an RIF unit 46 is a size of one antenna element. In some embodiments, the size of an RIF unit 46 is a size of two rows of two antenna elements per row. In some embodiments, the size of an LTCC tile 42 is N rows of M antenna elements per row, where N and M are integers. In some embodiments, the size of an RIF unit 46 is a size of an antenna element of the at least two antenna elements. In some embodiments, a module PCB 36 has a size of at least two RIF units. In some embodiments, the solder structures are solder balls or bumps.

According to another aspect, an antenna-filter array module 30 is provided. The antenna-filter array module includes a module printed circuit board, PCB 36, having a first side and a second side, the first side having first soldering structures and configured to be soldered to a low-temperature co-fired ceramic, LTCC, tile 42, the second side having second soldering structures, the second side configured to be coupled to a radio PCB. The antenna-filter array module further includes an LTCC tile 42 having at least two antenna elements and corresponding filters, the LTCC tile 42 being soldered to the first side of the module PCB 36 at the first soldering structures and cuttable into reliability issue free, RIF, units 46, each RIF unit being of a size not greater than a predetermined largest reliable size.

According to this aspect, in some embodiments, a difference between a coefficient of thermal expansion, CTE, of the module PCB 36 and a CTE of the radio PCB is chosen to be less than a predetermined amount. In some embodiments, the module PCB 36 and the radio PCB 40 are of the same material and have the same CTE. In some embodiments, a size of the module PCB 36 is greater than an area of an LTCC tile 42. In some embodiments, the size of an RIF unit is a size of one antenna element. In some embodiments, the size of an RIF unit is a size of two rows of two antenna elements per row. In some embodiments, the size of an LTCC tile 42 is a size of N rows of M antenna elements per row. In some embodiments, the size of an RIF unit is a size of an antenna element of the at least two antenna elements. In some embodiments, a module PCB 36 has a size equal to the LTCC tile 42 before cutting.

According to yet another aspect, a method of manufacturing an antenna-filter array module configured to be coupled to a radio printed circuit board, PCB, the antenna-filter array module having a module PCB 36 having a first side on which a first set of solder balls are positioned and having a second side on which a second set of solder balls are positioned, is provided. The method includes bonding a low temperature co-fired ceramic, LTCC, tile having a plurality of antennas and corresponding filters to a first side of the module PCB 36 via a first set of solder balls, a coefficient of thermal expansion, CTE, of the module PCB 36 being within a predetermined amount of a CTE of the radio PCB 40. The method further includes cutting the LTCC tile 42 into a plurality of reliability units after the bonding, each reliability unit having a size that is less than or equal to a predetermined largest reliable size.

According to this aspect, in some embodiments, a size of the module PCB 36 is a size of an LTCC tile 42. In some embodiments, the module PCB 36 and the radio PCB 40 are of the same material and have the same CTE.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviation | Explanation |
|---|---|
| AAS | Advanced Antenna System |
| CTE | Coefficient of Thermal Expansion |
| EM | Electromagnetic |
| LTCC | Low Temperature Co-fired Ceramics |

It will be appreciated by persons skilled in the art that the embodiments described herein are not limited to what has been particularly shown and described herein above. In addition, unless mention was made above to the contrary, it should be noted that all the accompanying drawings are not to scale. A variety of modifications and variations are possible in light of the above teachings without departing from the scope of the following claims.

What is claimed is:

1. An antenna-filter array module, comprising:

a module printed circuit board, PCB, having a first side and a second side, the first side having first soldering structures and configured to be soldered to a low-temperature co-fired ceramic, LTCC, tile, the second side having second soldering structures, the second side configured to be coupled to a radio PCB; and an LTCC tile having at least two antenna elements and corresponding filters, the LTCC tile being soldered to the first side of the module PCB at the first soldering structures, the LTCC tile being cuttable into reliability issue free, RIF, units, each RIF unit being of a size not greater than a predetermined largest reliable size.

2. The module of claim 1, wherein a difference between a coefficient of thermal expansion, CTE, of the module PCB and a CTE of the radio PCB is chosen to be less than a predetermined amount.

3. The module of claim 1, wherein the module PCB and the radio PCB are of the same material and have the same CTE.

4. The module of claim 1, wherein a size of the module PCB is greater than an area of an LTCC tile.

5. The module of claim 1, wherein the size of an RIF unit is a size of one antenna element.

6. The module of claim 1, wherein the size of an RIF unit is a size of two rows of two antenna elements per row.

7. The module of claim 1, wherein the size of an RIF unit is a size of an antenna element of the at least two antenna elements.

8. The module of claim 1, wherein a module PCB has a size equal to the LTCC tile before cutting.

* * * * *